Patented July 29, 1941

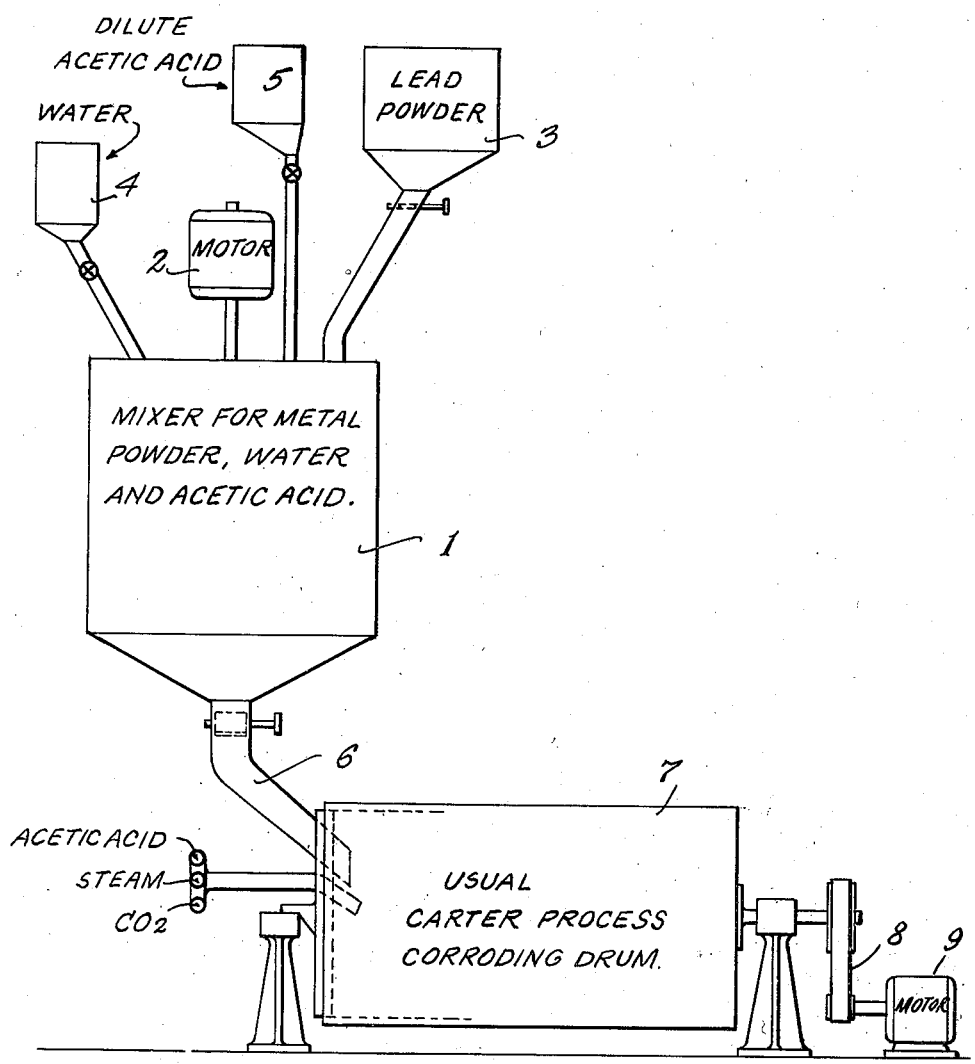

2,250,756

UNITED STATES PATENT OFFICE 2,250,756

MANUFACTURE OF WHITE LEAD

Allan W. Ferguson, Buffalo, N. Y., assignor to Oxides, Inc., Buffalo, N. Y.

Application September 26, 1938, Serial No. 231,782

8 Claims. (Cl. 23—70)

This invention relates to the conversion of metallic lead to basic lead carbonate, commonly known as white lead, and particularly to the commercial production of such white lead, following generally the procedure known as the Carter quick process. A description of the Carter process of making basic lead carbonate or white lead may be found in a book entitled "Lead and Zinc Pigments" by C. C. Holley, published in 1909 by John Wiley & Sons of New York city, first edition, particular reference being made to chapter 7. The fundamental chemical principles of the Carter process are the same as in the well known Dutch process in which metallic lead is treated with acetic acid to form lead acetate and the latter is then brought in contact with carbon dioxide gas, air and water, resulting in a chemical action which forms the basic lead carbonate.

In the old Dutch process, the lead employed was in the form of thin perforated slabs of metallic lead. The Carter process was based on the theory that if the metallic lead could be broken up into smaller particles that were exposed to the chemical action of the acetic acid and carbon dioxide gas, the conversion into the basic lead carbonate would be accomplished in a much shorter time. Under the Carter process the metallic lead was divided into small granular particles by steam atomization of the molten lead. This granular lead, about the size of coarse granulated sugar, was then rolled slowly in wooden drums, where it was subjected to the action of acetic acid, carbon dioxide, air and water.

On page 80, paragraph 93 of chapter 7 of the book "Lead and Zinc Pigments" by Holley, above referred to, where the Carter process is discussed in considerable detail, occurs the following statement:

"Great care must be exercised in not adding too large quantities of water or acid, or granulating the lead too fine in the first place, as in such instances the mass becomes so pasty as not to work properly in the drums, or is 'drowned out' as the workmen term it, which results in an almost entire cessation of chemical action, and can only be 'started' again by mixing with a large amount of fresh lead and recorroding."

The coarse granular lead commonly used in the Carter process is illustrated by the following screen analyses:

18% remains on a #20 mesh screen
31% passes a #20 mesh screen and remains on a #40 mesh screen
20% passes a #40 mesh screen and remains on the #60 mesh screen
14% passes a #60 mesh screen and remains on the #100 mesh screen
17% passes a #100 mesh screen As indicated in the above quotation from the text by Holley on the Carter process, great care was necessary to avoid granulating the lead too fine, or adding too much water, because the mass became so pasty that it could not be properly worked in the drums and formed large and hard balls which prevented or retarded complete conversion.

In the drawing, I have illustrated a diagram of the succession of steps forming one example of practicing this invention.

I have discovered that the time and expense required for conversion under the Carter process can be very substantially reduced by the use of an extremely fine metallic lead powder, and that it may be handled in the usual Carter process without becoming pasty or forming large or other hard balls of objectionable size. In my copending application Serial No. 187,424 filed January 28, 1938, I have disclosed and claimed apparatus for and methods of reducing metallic lead to a relatively and uniformly fine lead powder or dust, of which the following is a typical screen analysis, the proportions being approximate:

2.00% remains on a 100 mesh screen
2.00% passes a 100 mesh screen and remains on a 150 mesh screen
3.00% passes a 150 mesh screen and remains on a 200 mesh screen
1.60% passes a 200 mesh screen and remains on a 250 mesh screen
9.20% passes a 250 mesh screen and remains on a 325 mesh screen, and
81.80% passes a 325 mesh screen This very fine lead dust or powder is composed of particles which are only a small fraction of the size of each of the granular particles heretofore considered the minimum size for the successful standard application of the Carter process of making basic lead carbonate or white lead. Because of this greater fineness and number of particles of the metallic lead, the surface area of the metallic lead which is exposed to the chemical action is very greatly increased and by its use the period required for the usual Carter process of conversion can be reduced from about twelve days to three days or less and without the necessity of grinding or breaking up the particles during the process of conversion, and without the objections mentioned by Holley in his discussion of the Carter process. This powder is of such fineness that when moistened it tends to cake and form balls, which tendency is not overcome by the small degree of working which the moistened powder receives when placed in the usual, slowly rotating, corroding drum.

The difficulties arising with the use of metallic lead that was very fine, and against which Holley warned, can be overcome or avoided in accordance with my discovery by first moistening the fine powder, while mechanically working and mixing it, preferably with rubbing and kneading with just sufficient water in liquid form that is substantially free of acetic acid to make the moistened powder, after thorough mixing, damp to the touch but not wet; then while continuing the mechanical mixing and working, introducing into the damp lead dust a small amount of dilute acetic acid until the moisture content of the mass is increased but preferably does not greatly exceed about 1 per cent by weight of the mass. The mixing is continued until the acid solution is thoroughly incorporated through the mass. The working and mixing is of such a nature that it overcomes this tendency of the moistened powder to cake and form balls, and by the words "working" and "mixing," as used in the claims, I refer to working and mixing of such a kind and degree of violence, of which rubbing and kneading are examples, which will directly break up cakes and balls as soon as they start to form, other than by merely slowly rotating the mixture in a drum. This mixture may then be put into the drums used in the Carter process and the conversion carried on as previously in the Carter process without the formation of hard, non-porous balls or pasty masses.

By way of a specific example, a fine lead powder or dust of a fineness approximating the second screen analysis above mentioned, is put into a mechanical mixer and thoroughly worked and mixed. Any efficient type of mechanical mixer may be employed for this purpose. Then while the lead powder is under mixing agitation, water which is substantially free of acetic acid is slowly added, such as by spraying it at intervals upon the mass being mixed. I have found that about 20 pounds or 2½ gallons of water per 2,000 pound ton of lead powder, will give about the degree of dampness which is most effective. This water when in liquid form thoroughly mixed into the lead powder makes the powder damp to the touch but not wet. The mixing is continued until the mass is of smooth texture and its temperature has started to rise quite rapidly due to the oxidizing action from the contact of the metallic lead with the moisture and air.

This rapid and thorough mechanical dampening of the lead powder prior to its treatment with the acid is an important step enabling the successful and practical use of the finer powder in the Carter process, and which makes possible a subsequent and easy mixing of the acetic acid solution with the fine lead dust without causing the formation of large or hard balls or aggregations. After the dampening of the lead powder with water alone has been completed, and while the agitation or mixing is continued, I slowly add to the mass a dilute solution of acetic acid, preferably of not more than 10% acid and usually within the range of from 5 to 10% of acid. I have found that 6 to 7% dilute acetic acid solution is very effective in accordance with this discovery. This dilute solution is slowly sprayed upon or added to the dampened and warm lead powder under agitation. I have obtained excellent results by using about 7 gallons of 6 to 7% acetic acid solution for every 2,000 pounds of lead dust.

The agitation and mixing of the mass is continued, during which the acid solution reacts with the lead powder and causes the mass to expand considerably and heat up rapidly to around 150° F. to 160° F., apparently due to the vigorous chemical action between the water, acetic acid and the lead. Because of the thorough mixing and working of this dampened mass to which the dilute acetic acid has been added, the rubbing and kneading action on the mass evenly and quickly brings every minute particle of the metallic lead dust in contact with the water and acetic acid, and produces a more rapid and thorough contacting of the lead particles with the acid to start the conversion. After this dilute acetic acid solution has been thoroughly mixed into the premoistened lead power, the resulting mass is a damp, loose, expanded and rather fluffy material of grayish or slightly greenish-gray color and may appear to contain a few small lumps or granules, but these lumps are merely loose porous aggregations of particles into which the carbon dioxide readily penetrates for carbonation.

As explained above, the very fine powder is first preferably moistened slowly with water alone in liquid form, and then with the dilute acid because the addition of the dilute acid to the entirely dry, very fine powder has some tendency to form hard balls or masses which either adhere to the mixing apparatus or to the walls of the mixer, and I have found that by using a small amount of acid free water first, and then adding the dilute acid solution, this difficulty is substantially overcome. Where the mixer is of the type that more intensely and effectively works the mass, such as one that kneads and rubs the mass as the moistening liquid is being added, it is possible to mix the water and the dilute acid and add them slowly together to the powder during the working and any lumps or hard balls which tend to form are broken up into the original powder form as rapidly as they form. Such hard masses are so impervious that complete corrosion would be delayed or complete conversion prevented. By adding the water alone first, and then the dilute acid, I am able to use a mixing device which is of simple construction, and therefore, less expensive.

After the mass has reached this state, it may then be subjected to the usual Carter process in the carbonating drums or conversion equipment, where the conversion is completed. In this further conversion, the mass is moved in a manner to repeatedly expose fresh particles to the acetic acid, moisture and carbon dioxide gas, and hence the conversion into the basic lead carbonate proceeds rapidly due to the extreme fineness of the particles and the absence of large and hard non-porous balls or aggregations.

In the accompanying drawing, one form of apparatus that may be used to carry out this improved process is illustrated diagrammatically. The apparatus includes a mixer 1 of any suitable type, which mechanically stirs and works the powder with the added water and dilute acetic acid. Such a mixer may be formed of a casing having therein a rotatable agitator bearing mechanical stirring arms which preferably scrape the walls as well as agitate and stir the interior of the mass in the casing, and this agitator is driven in any suitable manner, such as by a motor 2. Such mixers are available in the open market, and for that reason, the details by themselves have not been illustrated or described. Preferably the mixer is one in which the mass is not only stirred in this manner, but in which the mass is also simultaneously rubbed and kneaded so as to prevent the formation of lumps or balls and to break up any that may tend to form before they have become hard and impervious. The powder may be supplied to the mixer in any suitable manner such as from a source 3, and the water alone may be supplied from a source 4, and the dilute acetic acid from the source 5. After the mass has been thoroughly mixed and worked in the casing or chamber 1, it is conveyed in any suitable manner, as represented diagrammatically by the chute 6, to the interior of the Carter process corroding drum 7. Such drums are shown, for example, in United States Patent to Iliff No. 1,898,054 granted Feb. 21, 1933 and Tolman No. 1,447,740 granted March 6, 1923, to which reference may be had for further details. This corroding drum is usually mounted for very slow rotation so as to very slowly roll the powdered lead therein, and at the same time expose it to the action of moisture, acetic acid and carbon dioxide, as common in a Carter process, such moisture, acid and carbon dioxide being added slowly to the interior of the drum during the rotation of the same. The drum is rotated slowly in any suitable manner such as by a speed reduction device 8 and a motor 9.

It will be understood that the final conversion of the mass which has been premoistened and pretreated with a dilute acetic acid may be carried out with other apparatus than the usual revolving drums of the Carter process. For example, such a mass may be conveyed slowly through a carbonating or conversion chamber on any suitable conveyors and slowly agitated or stirred while being so conveyed, so as to bring fresh parts of the mass repeatedly into contact with the steam, air, acetic acid vapors, and carbon dioxide gas that are present in the chamber or which are added to the chamber at intervals. The conveyor may be a series of endless conveyors for handling the mass in thin layers, the mass being delivered from one conveyor to another in succession to obtain the necessary duration of travel or exposure within a practical and compact chamber. When the mass is transferred from one conveyor to another, it may, if found desirable, be passed through crushing rollers which tend to break up any pellets or porous or other aggregations that may form, while still within the conversion chamber, thus hastening the complete conversion.

It will be understood that this improved method of pretreating the metallic lead is not restricted solely to metallic lead powder of the fineness given in the second screen analysis hereinabove, but is similarly applicable when the subdivision of the lead is reduced substantially below the granular condition specified by Holley as preferable in the Carter process. Obviously the finer the particles, the more rapid the conversion, and by this method the powder may be made as fine as possible and handled easily and without the objections heretofore existing to the use of fine powders.

If an attempt is made to add the moisture in liquid form to the dry powder in the corroding drum, the powder tends to form hard and impervious lumps and balls and to also adhere to the walls of the drum and form a layer of material which resists the penetration of the corroding agents with the result that a portion of the mass is unconverted. This difficulty in using the dry powder in the corroding drum at the start of the operation is aggravated very decidedly when the powdered lead is of extreme fineness, such as of such a fineness that at least 90% of it will pass through a 150 mesh screen. This difficulty increases rapidly with the increase in fineness of the powdered lead. The addition of the moisture to the dry powder must be extremely slow in the corroding drums, but by pre-mixing the water and dilute acid in a mechanical mixer separate from the corroding drum, where there is a positive stirring or kneading action, the addition of the water and acid can be relatively rapid and difficulties with lumps, balls, and adherence of the mass to the walls of the mixing chamber prevented. The powder, by this mixing, is not only moistened, but the mass is loose, fluffy and very porous, so that very rapid corrosion occurs when subjected to the corroding action in the usual corroding drum.

It will be further understood that various changes in the details, proportions and steps which have been herein described in order to explain the nature of the invention, may be made by those skilled in the art within the principle and scope of the invention, as expressed in the appended claims.

I claim as my invention:

1. In the manufacture of white lead by the "Carter process," in which subdivided metallic lead is treated in a corroding chamber simultaneously with water, acetic acid and carbon dioxide, that improvement which comprises pre-mixing the metallic lead in finely divided powder form of such fineness that when moistened, it tends to cake and form balls and the mechanical mixing and working which it would receive in a slowly rotating drum will not overcome such tendency, with water in liquid form and a small amount of acetic acid in a chamber separate from said corroding chamber and mechanically working and mixing the powder to overcome this tendency to cake and form balls, until substantially all of the powder particles are loose and uniformly coated with the water and acid, and then introducing the moistened powder into the corroding chamber and there converting it into white lead.

2. In the manufacture of white lead by the "Carter process," in which subdivided metallic lead is treated in a corroding chamber simultaneously with water, acetic acid and carbon dioxide, that improvement which comprises mechanically stirring and working in a chamber separate from said corroding chamber, the metallic lead in powder form of such fineness that when moistened, it tends to cake and form balls and the mechanical mixing and working which it would receive in a slowly rotating drum will not overcome such tendency, while adding slowly thereto water in liquid form and a small amount of acetic acid, until substantially all of the powder particles are uniformly coated with the water and acid, and the mass is damp to the touch but not wet, and is loose, expanded and rather fluffy, and then introducing the moistened mass into the corroding chamber and there converting it into white lead.

3. In the manufacture of white lead by the "Carter process," in which subdivided metallic lead is treated in a corroding chamber simultaneously with water, acetic acid and carbon dioxide, that improvement which comprises premixing the metallic lead in finely divided powder, of such fineness that at least 90% of it will pass through a 150 mesh screen, with water in liquid form and a small amount of acetic acid in a chamber separate from said corroding chamber, with mechanical working and mixing sufficient to overcome any tendency of the powder to cake or form balls, until substantially all the powder particles are uniformly coated with the water and acid and are loose, and then introducing the moistened powder into the corroding chamber and there converting it into white lead.

4. In the manufacture of white lead by the "Carter process," in which subdivided metallic lead is treated in a corroding chamber simultaneously with water, acetic acid and carbon dioxide, that improvement which comprises mechanically working and mixing in a chamber separate from said corroding chamber, the metallic lead in fine powder form of such fineness that at least 90% of it will pass through a 150 mesh screen, while adding slowly thereto water in liquid form and a small amount of acetic acid, until substantially all of the powder particles are uniformly coated with the water and acid, and the mass is damp to the touch but not wet, and is loose, expanded and rather fluffy, the working and mixing being of a kind and degree of violence which will be sufficient to overcome the tendency of the moistened powder to cake and form balls, and then introducing the moistened mass into the corroding chamber and there converting it into white lead.

5. In the manufacture of white lead by the "Carter process," in which subdivided metallic lead is treated in a corroding chamber simultaneously with water, acetic acid and carbon dioxide, that improvement which comprises pre-mixing and mechanically working and mixing the metallic lead in powder form, of such fineness that at least 90% of it will pass through a 150 mesh screen, with water in liquid form, and with dilute acetic acid not stronger than 10% acid, in a chamber separate from said corroding chamber until substantially all of the powder particles are uniformly coated with the water and acid, the working and mixing being of a kind and degree of violence which will be sufficient to overcome the tendency of the moistened powder to cake and form balls, and then introducing the moistened powder into the corroding chamber and there converting it into white lead.

6. In the manufacture of white lead by the "Carter process," in which subdivided metallic lead is treated in a corroding chamber simultaneously with water, acetic acid and carbon dioxide, that improvement which comprises mechanically stirring and working in a chamber separate from said corroding chamber, the metallic lead in fine powder form of such fineness that at least 90% of it will pass through a 150 mesh screen, and kneading and rubbing the powder during the working while adding slowly thereto water in liquid form and a small amount of acetic acid not stronger than 10% acid until substantially all of the powder particles are uniformly coated with the water and acid and the mass is damp to the touch but not wet, and is loose, expanded, and rather fluffy, and before the added moisture has materially exceeded 1% by weight of the mass, and then introducing the moistened mass into the corroding chamber and there converting it into white lead.

7. In the manufacture of white lead by the "Carter process," in which subdivided metallic lead is treated in a corroding chamber simultaneously with water, acetic acid and carbon dioxide, that improvement which comprises mechanically stirring, kneading, and rubbing metallic lead in powdered form, of such fineness that at least 90% of it will pass through a 150 mesh screen, while adding slowly thereto water in liquid form, and a small amount of acetic acid not stronger than a 10% acid solution, until substantially all of the powder particles are uniformly coated with the water and acid and the mass is damp to the touch but not wet, and is loose, expanded and rather fluffy, and then introducing the moistened mass into the corroding chamber and there converting it into white lead.

8. In the manufacture of white lead by the "Carter process," in which subdivided metallic lead is treated in a corroding chamber simultaneously with water, acetic acid and carbon dioxide, that improvement which comprises premixing the metallic lead in finely divided powder form of such fineness that when moistened, it tends to cake and form balls and the mechanical mixing and working which it would receive in a slowly rotating drum will not overcome such tendency, with water, in liquid form and a small amount of acetic acid, and mechanically working and mixing the powder with sufficient violence to overcome this tendency to cake and form balls until all of the powder particles are loose and uniformly coated with water and acid, and then treating the moistened powder in a corroding chamber with water, acetic acid and carbon dioxide until it is converted into white lead.

ALLAN W. FERGUSON.